No. 629,385. Patented July 25, 1899.
R. ROMAINE, Dec'd.
F. L. MIDDLETON, Administrator.
POWER DRIVEN MECHANISM FOR CULTIVATING AND HARVESTING.
(Application filed Mar. 21, 1898.)
(No Model.) 9 Sheets—Sheet 5.
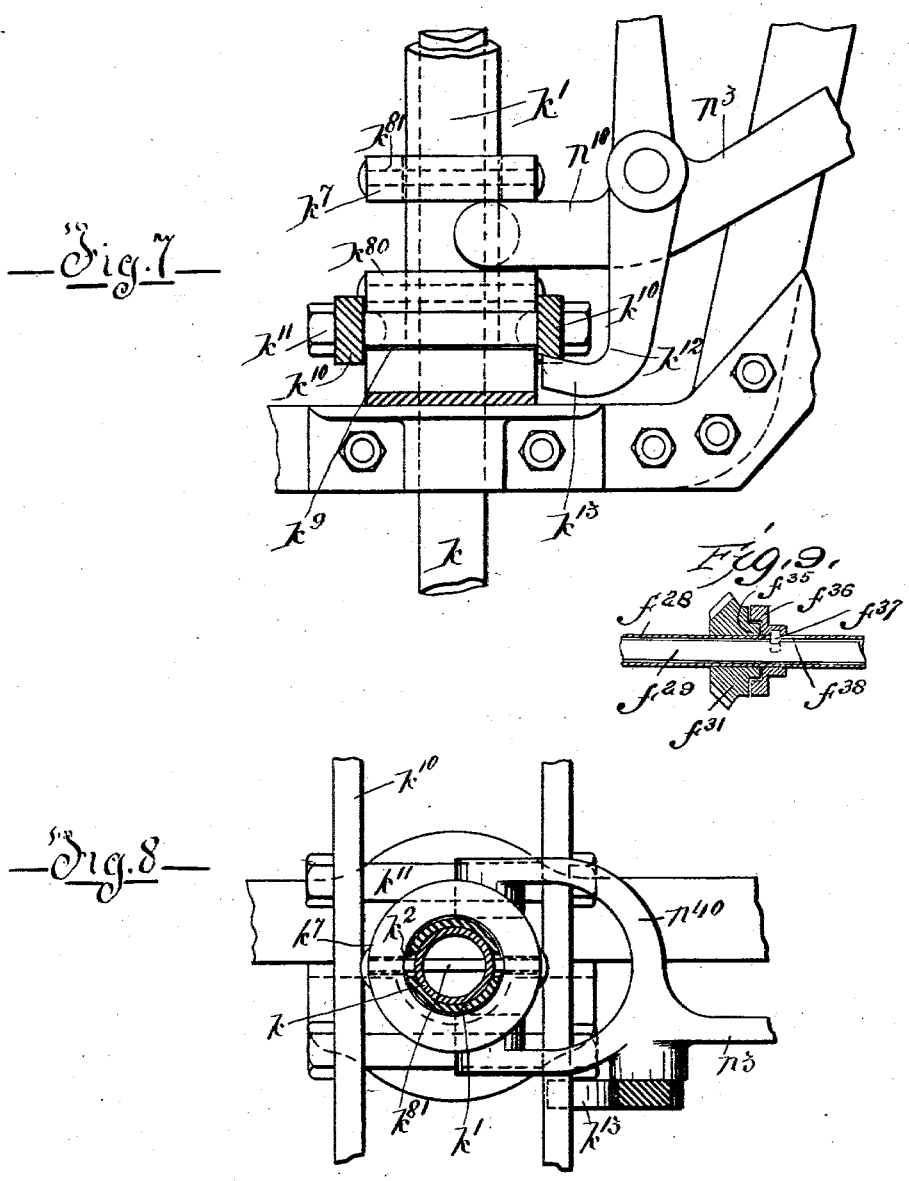

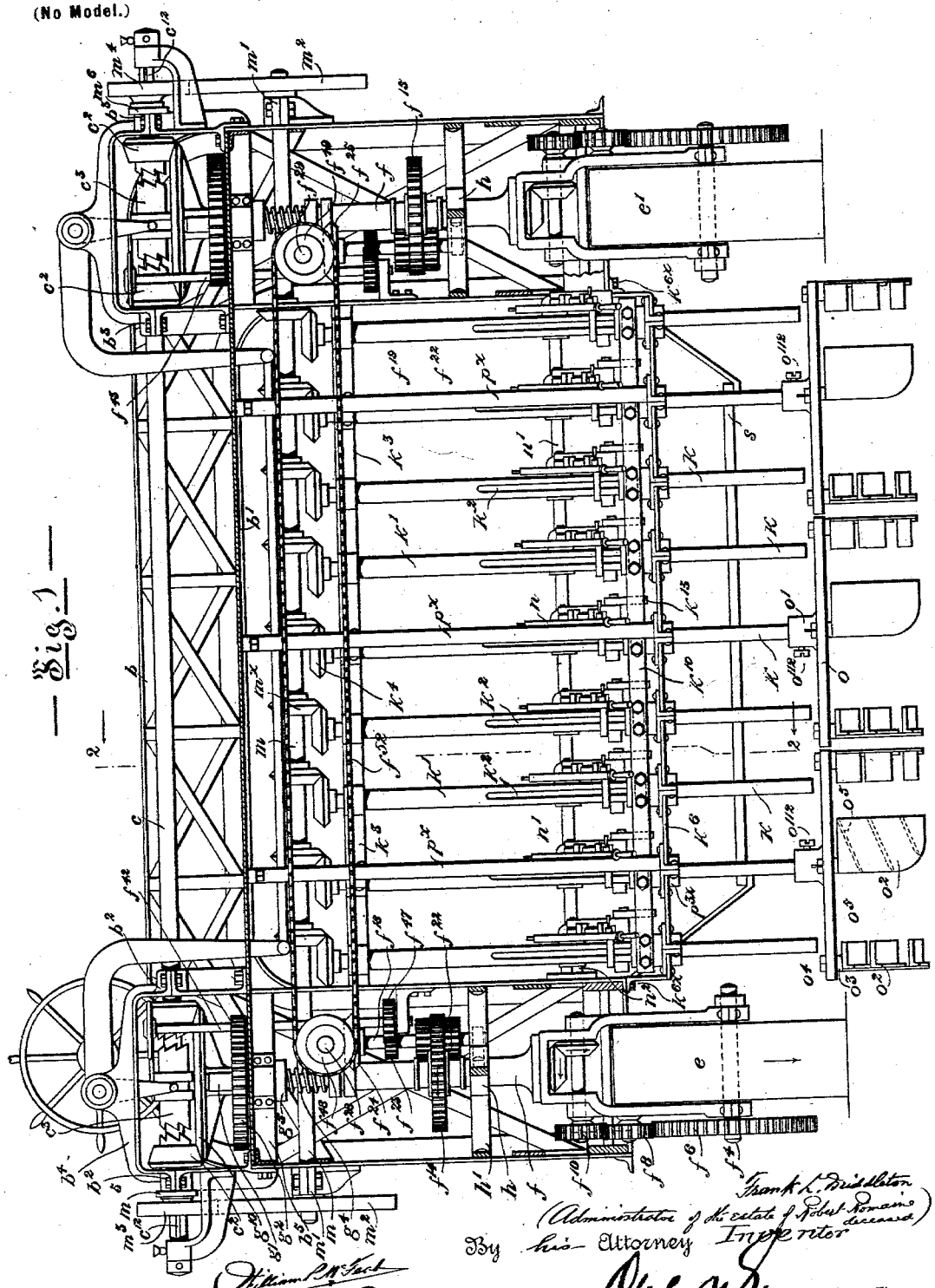

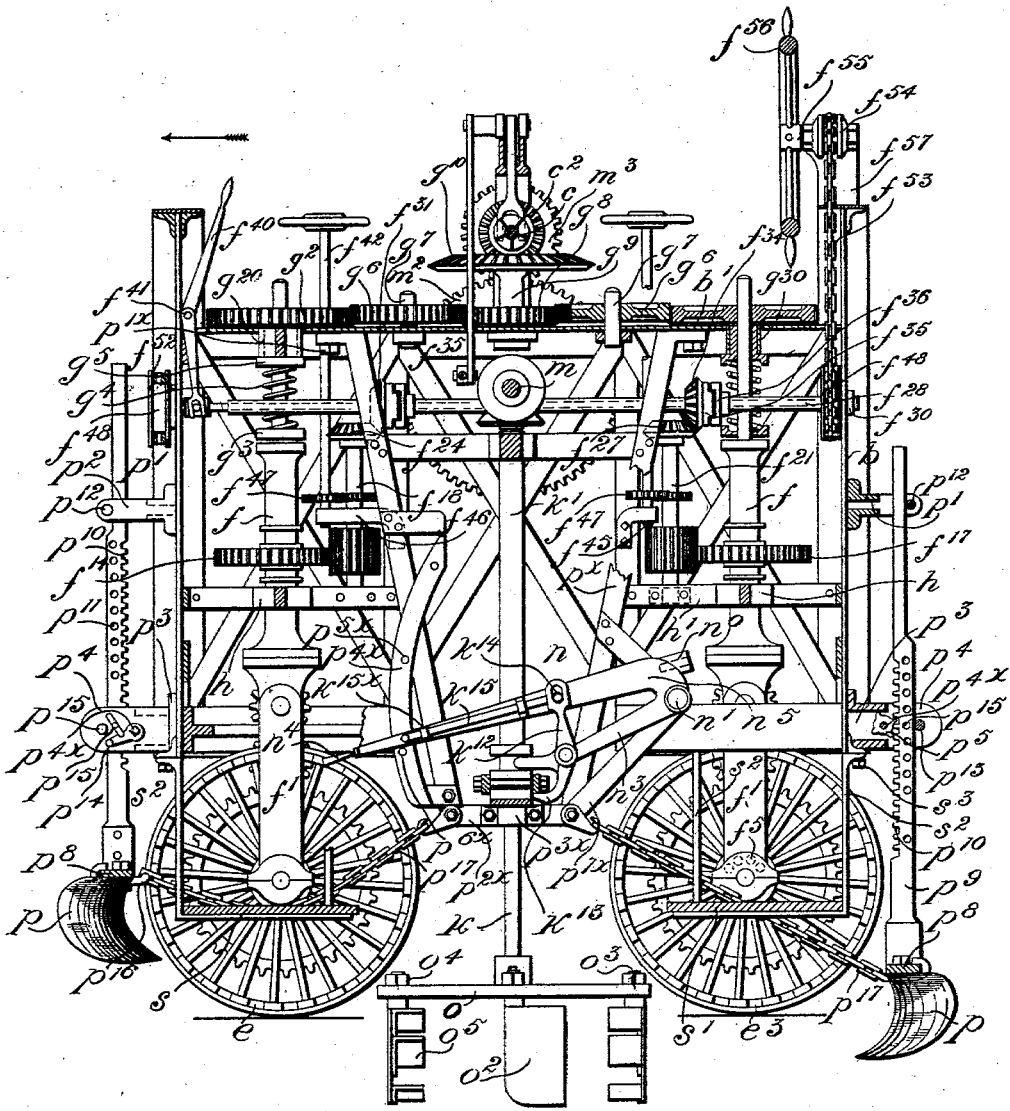

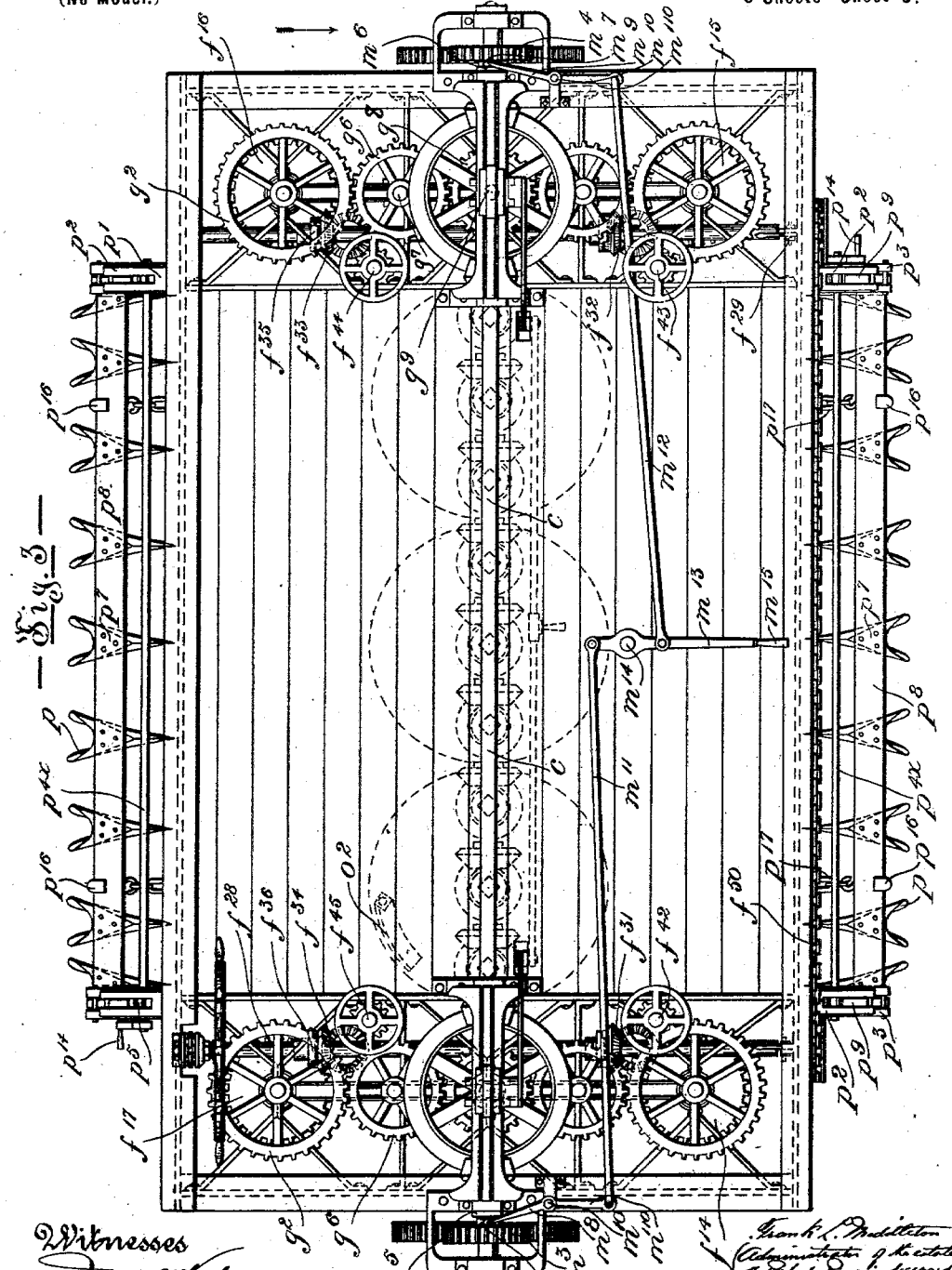

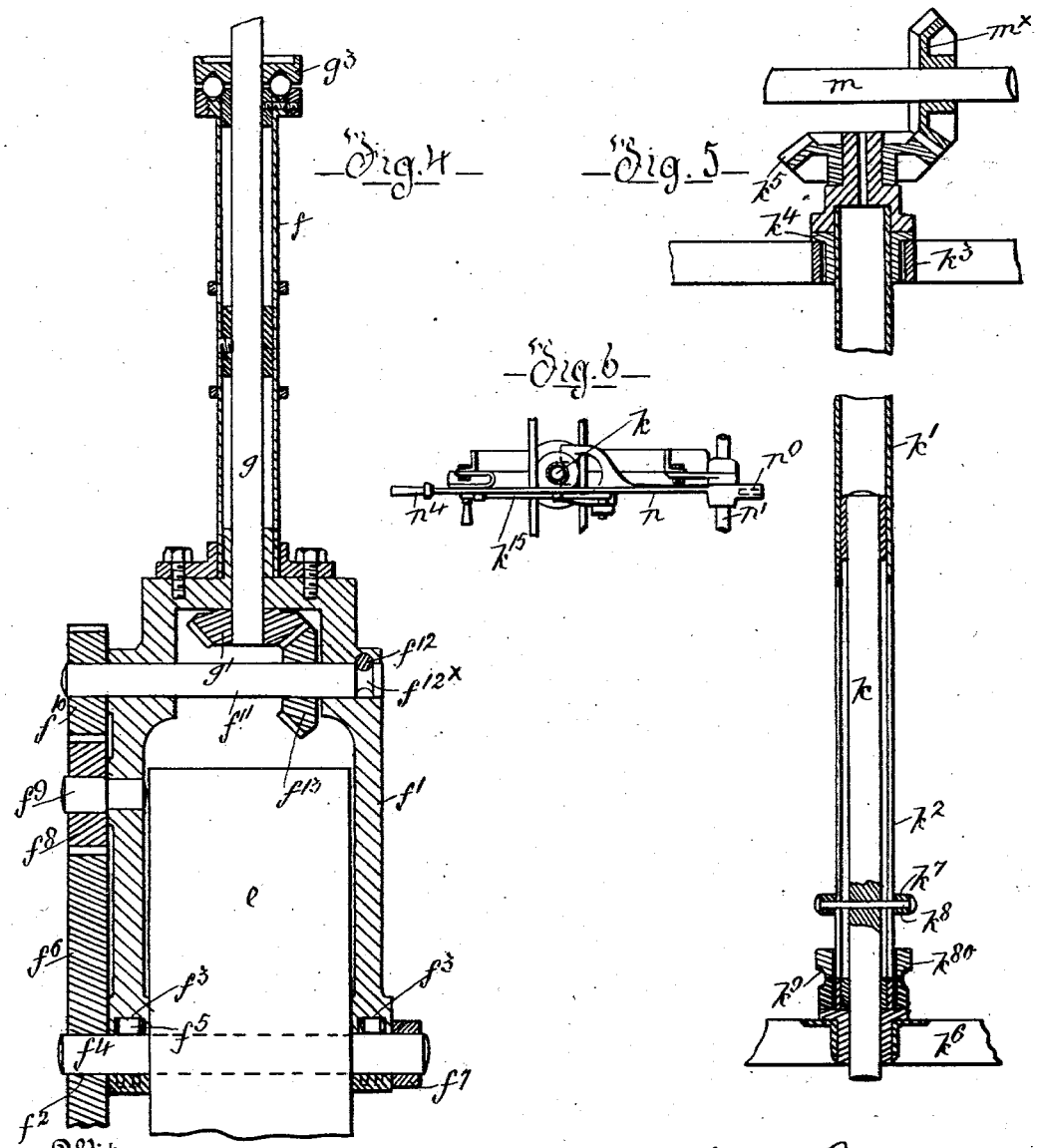

No. 629,385. Patented July 25, 1899.
R. ROMAINE, Dec'd.
F. L. MIDDLETON, Administrator.
POWER DRIVEN MECHANISM FOR CULTIVATING AND HARVESTING.
(Application filed Mar. 21, 1898.)
(No Model.) 9 Sheets—Sheet 6.
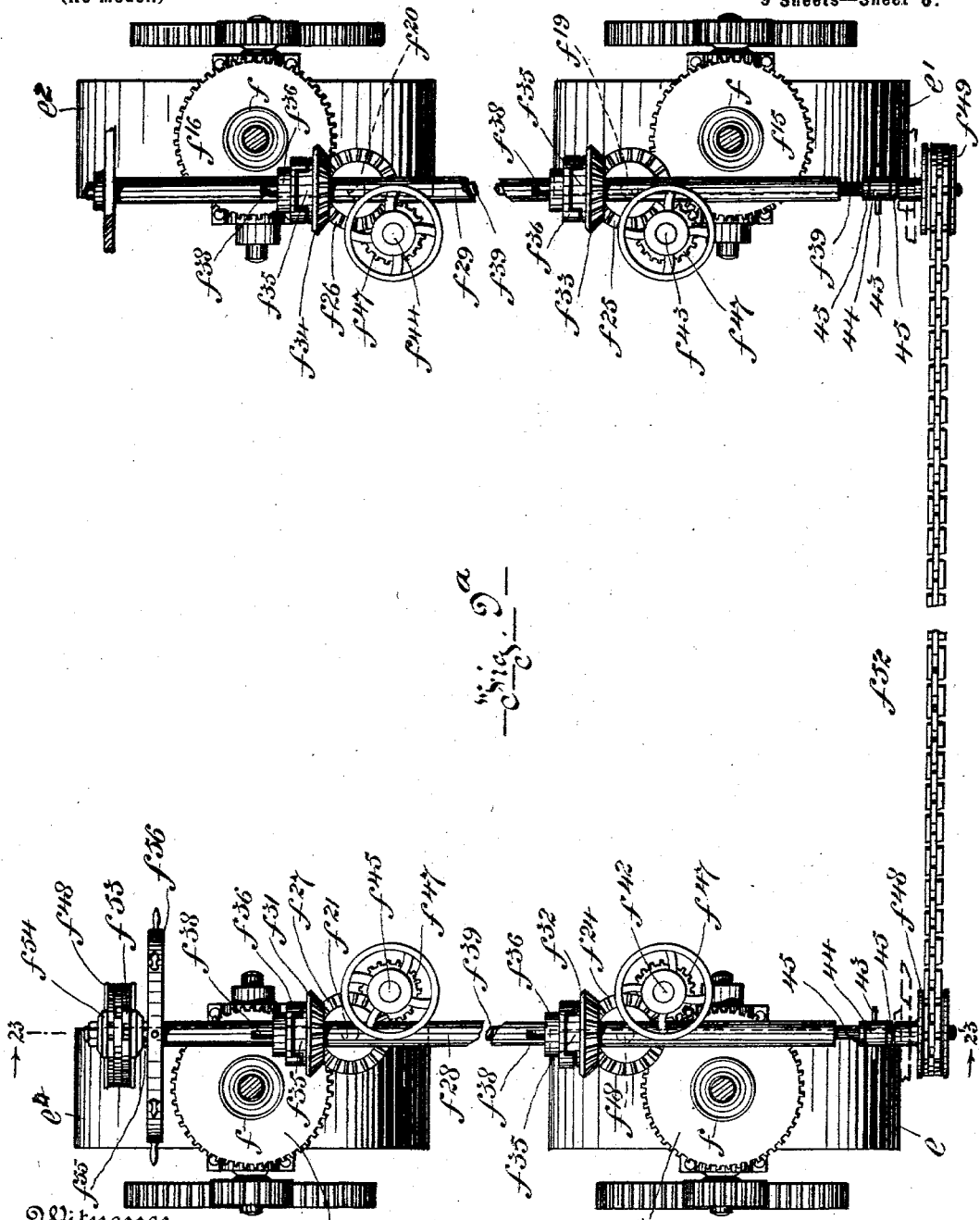

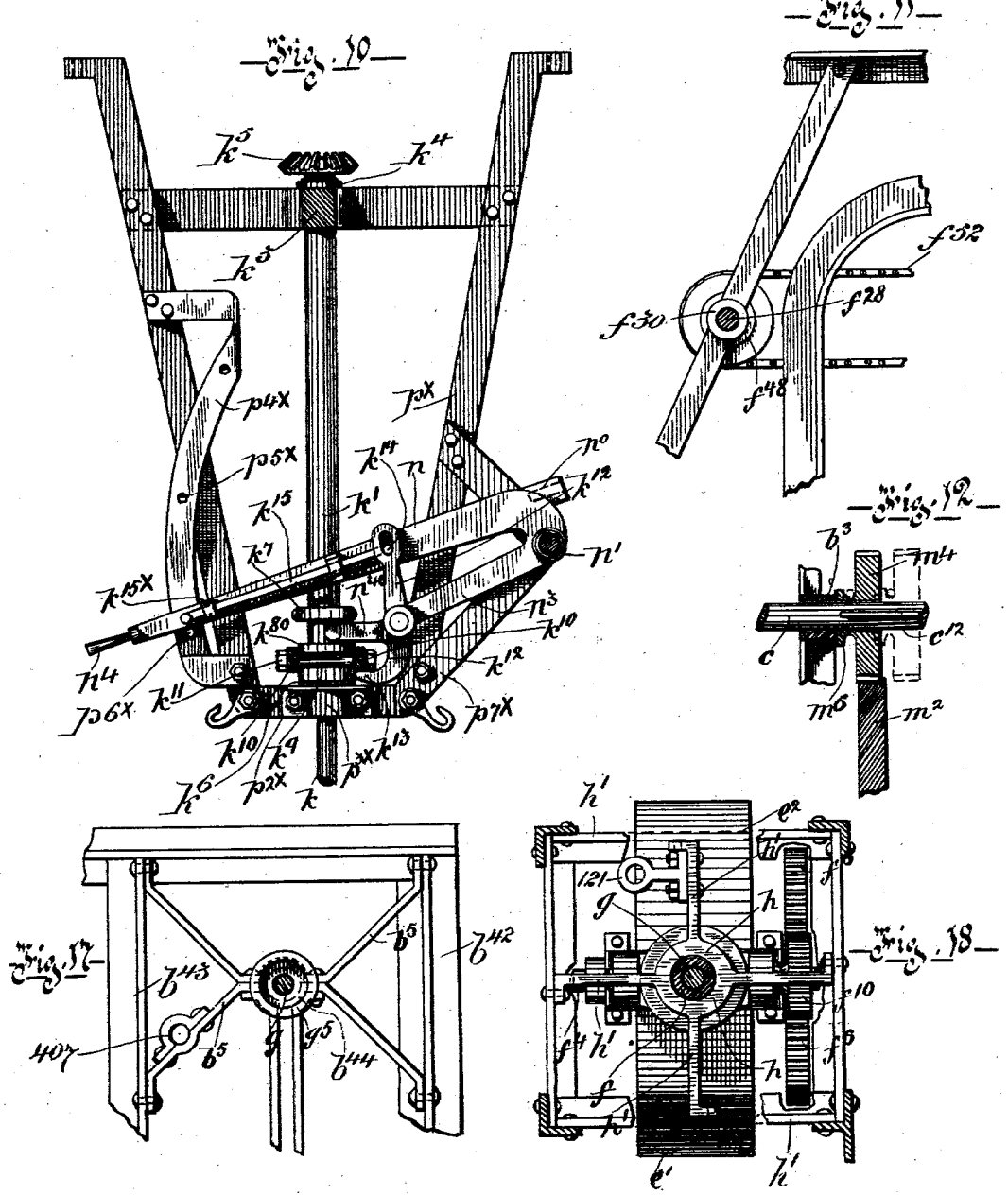

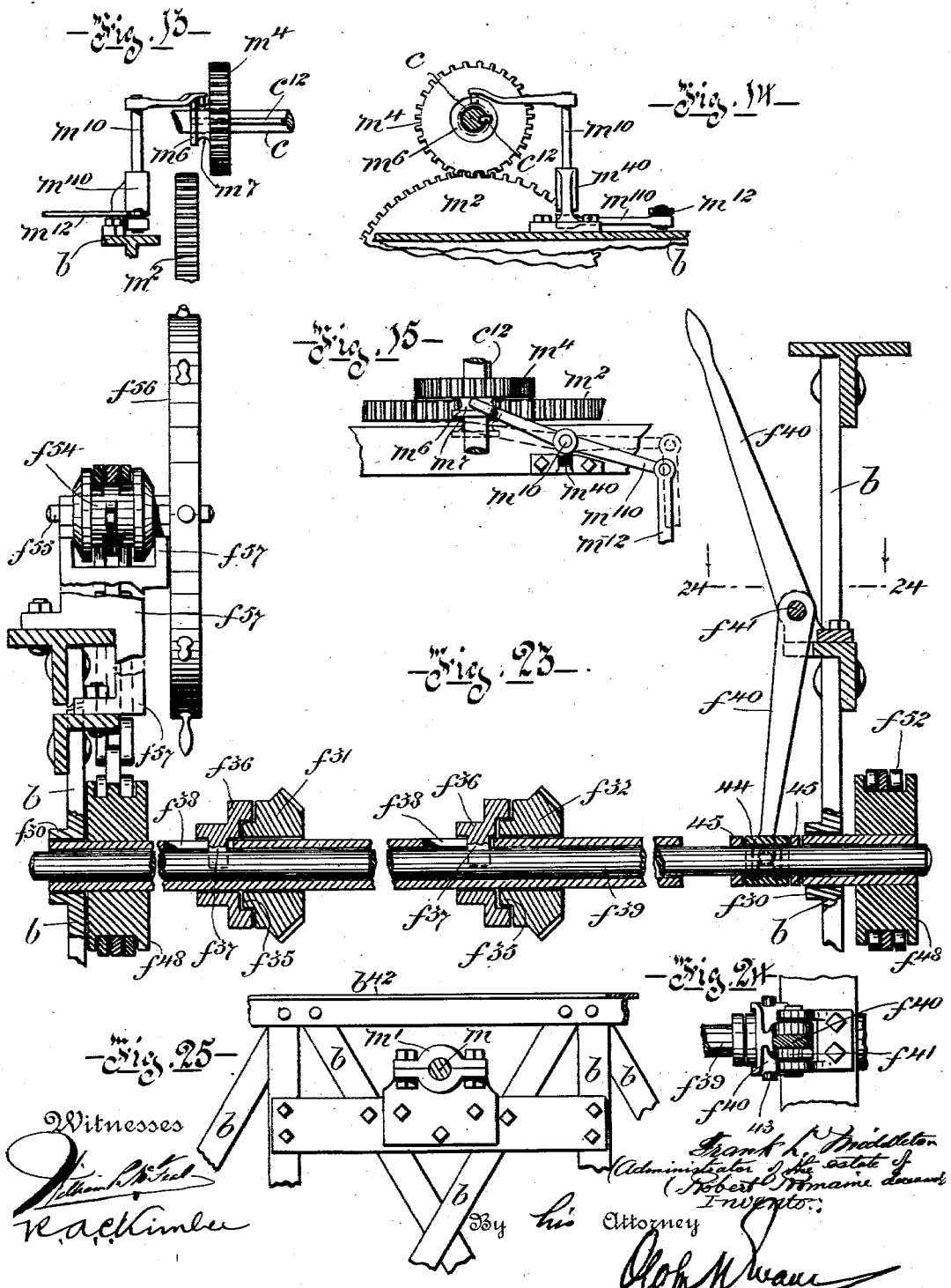

No. 629,385.

R. ROMAINE, Dec'd.
F. L. MIDDLETON, Administrator.
POWER DRIVEN MECHANISM FOR CULTIVATING AND HARVESTING.

(Application filed Mar. 21, 1898.)

(No Model.)

Patented July 25, 1899.

9 Sheets—Sheet 9.

UNITED STATES PATENT OFFICE.

FRANK L. MIDDLETON, OF BRANCHVILLE, MARYLAND, ADMINISTRATOR OF ROBERT ROMAINE, DECEASED, ASSIGNOR TO THE ROMAINE AUTOMATIC AGRICULTURAL MACHINE COMPANY, LIMITED, OF MONTREAL, CANADA.

POWER-DRIVEN MECHANISM FOR CULTIVATING AND HARVESTING.

SPECIFICATION forming part of Letters Patent No. 629,385, dated July 25, 1899.

Application filed March 21, 1898. Serial No. 674,694. (No model.)

*To all whom it may concern:*

Be it known that I, FRANK L. MIDDLETON, a citizen of the United States, residing at Branchville, Prince George's county, Maryland, administrator of the estate of ROBERT ROMAINE, of Ottawa, Canada, deceased, declare that I verily believe the said ROMAINE did invent certain new and useful Improvements in Power-Driven Machines for Cultivating and Harvesting, of which the following is a specification.

This invention relates to power-driven machines to be used in cultivation and harvesting; and the object thereof is to so improve the general construction of machines of this class that they may be more readily transported from place to place and give better results than have been attainable heretofore.

The invention may be said, briefly, to consist in constructing the main frame of inverted-U shape, a pair of traction-wheels being mounted in each leg thereof and the working tools being supported between said legs and constructed to cut into the surface of the ground and disintegrate same for a depth that can be varied by means for raising and lowering said tools, while a series of tools of double moldboard form are carried by said frame in rear of the said working tools and are adapted to act upon the subsoil said working tools will have disintegrated.

For full comprehension, however, of the invention reference must be had to the accompanying drawings, in which like symbols indicate the same parts, and wherein—

Figure 1 is a front elevation of an apparatus for farm cultivation constructed according to the present invention, the frame being illustrated partly in section; Fig. 2, a transverse vertical sectional view thereof; Fig. 3, a plan view thereof; Fig. 4, a detail transverse vertical sectional view of one of the steering-pedestals; Fig. 5, a similar view of one of the improved spindle-operating sleeves; Fig. 6, a detail plan view of one of the spindle-lifting levers; Fig. 7, an enlarged detail side elevation illustrating the point of connection of one of the levers with the spindle; Fig. 8, a plan view thereof; Fig. 9, a detail longitudinal sectional view of a portion of one of the hollow shafts and bevel-gear mounted thereon. Fig. 9$^a$ is a plan view of the steering mechanism. Fig. 10 is a detail side elevation of one of the tool-carrying spindles, its raising and lowering lever and carrying-frame all removed from the main frame. Fig. 11 illustrates in detail one of the bearings for one of the horizontal shafts of the steering mechanism. Figs. 12, 13, 14, and 15 illustrate in detail the means for putting the rotary tools into and out of operation. Fig. 16 is a detail front elevation of one of the forked sleeves, together with the parts immediately connected thereto. Figs. 17 and 18 are horizontal sectional views thereof, taken on lines 17 17 and 18 18, respectively, Fig. 16, and looking in the directions indicated. Fig. 19 is a detail sectional view of one of the horizontal bevel-gears for transmitting power from the main shaft to the train of gears for driving the traction-wheels. Fig. 20 is a detail view of one of the brackets at the ends of the shaft upon which the levers for lifting the spindle are fulcrumed. Figs. 21 and 22 are detail views of one of the oscillatory blades of the rotary tool. Fig. 23 is a detail longitudinal sectional view of one of the shafts of the steering-gear, the section being taken on line 23 23, Fig. 9$^a$. Fig. 24 is a part plan and part sectional view on line 24 24, Fig. 23; and Fig. 25 is an elevation of one of the bearings for supporting the shaft for operating the rotary tools and the portion of the frame for supporting said bearing.

The main frame $b$ of the machine is of inverted-U form, oblong and rectangular in plan view. The horizontal portion of this main frame is partially decked or provided with a platform, as at $b'$, and carries two pairs of bearings $b^2$ $b^2$ and $b^3$ $b^3$, located one pair at each end and each pair being braced together by a bridge-section $b^4$. A horizontal driving-shaft $c$ extends from one end to the other of this frame and is carried in the bearings $b^2$ $b^2$ $b^3$ $b^3$, while the central portion of this shaft is operatively connected to any approved form of engines (not shown) supported upon the deck or platform $b'$.

The frame of the machine is supported upon traction-wheels $e$, $e'$, $e^2$, and $e^3$, these wheels being mounted in the lower forked end of four sleeves $f$, of which only one will be described in detail, as they (together with their carrying and operating parts and parts carried thereby) are precisely similar in construction. The sleeve $f$ (see Figs. 1, 2, 4, 9, and 16) is of straight cylindrical form and has a forked section $f'$, secured to or formed in one with the lower end thereof and perforated and recessed, as at $f^2$ and $f^3$, respectively, these perforations receiving and affording bearings for an axle $f^4$, upon which and centrally thereof one—$e$, for instance—of such traction-wheels is rigidly mounted, while the recesses receive antifriction-rollers $f^5$. A pinion $f^6$ is mounted rigidly upon one end of such axle $f^4$ and a retaining-collar $f^7$ rigidly upon the other end thereof, such pinion $f^6$ intermeshing with an idler $f^8$, mounted upon a stub-spindle $f^9$, mounted in the prong of the fork adjacent to which the pinion $f^6$ is mounted. A third pinion $f^{10}$ intermeshes with such idler and is mounted rigidly upon one end of a spindle $f^{11}$, mounted adjacent to the base of the prongs of the fork, this latter spindle being retained against longitudinal displacement by a pin $f^{12}$, passed at right angles to such spindle through one of the prongs of the fork and through a peripheral groove $f^{12\times}$ near the end of such spindle. A vertical spindle $g$ is located within said sleeve $f$ with its lower end projecting a short distance through the lower end thereof and has a miter-gear $g'$ mounted rigidly thereon, adapted to intermesh with a second miter-gear $f^{13}$, mounted rigidly upon the spindle $f^{11}$. The upper end of this vertical spindle extends through the open top of the frame $b$, where it is stayed by a series of diagonally-offset cross-bars $b^5$, (see Figs. 16 and 17,) secured between transverse end T-bar $b^{43}$ for supporting the ends of the deck $b'$. Each corner of the top of the frame is formed with these cross-bars $b^5$, (see Fig. 3,) and the juncture of the bars $b^5$ of each corner forms a bearing $b^{44}$, through which said upper end of the spindle $g$ is free to slide when the weight of the machine overcomes the resistance of springs $g^4$, to be presently described. A pinion $g^2$ takes over the upper end of this spindle $g$ and is operatively connected thereto by a feather on the pinion and a groove $b^{45}$ in the spindle. A washer $g^3$ is fitted over the spindle $g$ and rests upon the top of sleeve $f$, and a helical spring $g^4$ encircles the spindle and bears between such washer $g^3$ and a collar $g^5$, provided with a sleeve-like portion $g^{30}$, (see Figs. 2 and 16,) adapted to take into the bearing $b^{44}$ and act as a bushing.

The pinion $g^2$ intermeshes with an intermediate pinion or idler $g^6$, mounted loosely upon the upper end of a stub-spindle $g^7$, set rigidly in the top frame of the machine, (see Fig. 3,) and this idler in turn intermeshes with a pinion $g^8$, mounted rigidly upon and about midway of the length of a vertical stub-spindle $g^9$, set at one end rotatably in the top frame and having a bevel-gear $g^{10}$, mounted rigidly thereon (see Figs. 3 and 19) and located in close proximity to the main driving-shaft $c$. A pair of bevel-gears $c^2 c^2$, formed with clutch-faces, are mounted loosely upon said main shaft and intermesh with such gear $g^{10}$, each of which gears $c^2 c^2$ may be caused to rotate with the shaft by means of a clutch-block $c^3$, mounted upon the shaft intermediately of said gears $c^2 c^2$ and connected to the ribs by feather and groove and adjustable along same into engagement with either of such gears $c^2 c^2$, thus enabling the travel of the machine to be stopped at any time or direction of such travel to be reversed at will.

The sleeves $f$ are mounted loosely in bearings $h$, formed by cross-pieces $h'$, secured to the frame by bolts or the like at the corners thereof, while such sleeves are also guided on the spindles $g$, thus allowing such sleeves to be freely rotated for the purpose of steering the machine while traveling. The preferred means whereby this steering may be done consists of pinions $f^{14}$, $f^{15}$, $f^{16}$, and $f^{17}$, mounted rigidly one upon each of the four sleeves $f$, about midway of their height. Vertical spindles $f^{18}$, $f^{19}$, $f^{20}$, and $f^{21}$ are rotatably carried in bearings 121 on the frame adjacent to said respective pinions $f^{14}$, $f^{15}$, $f^{16}$, and $f^{17}$ and have rigidly mounted thereon elongated gear-wheels $f^{22}$ near the lower end of said spindles and adapted to intermesh with the pinions $f^{14}$, $f^{15}$, $f^{16}$, and $f^{17}$. A pinion $f^{23}$ is mounted upon each of said pinions $f^{18}$, &c., about midway of the length thereof, and bevel-gears $f^{24}$, $f^{25}$, $f^{26}$, and $f^{27}$ are mounted on the upper ends thereof, respectively. A pair of horizontal hollow shafts $f^{28} f^{29}$ are mounted one at each end of the machine in bearings $f^{30}$, formed on four of the cross-stays, Fig. 17, of the frame. Bevel-gears $f^{31}$, $f^{32}$, $f^{33}$, and $f^{34}$, (see Figs. 2, 3, 9, 9$^a$, and 23,) intermeshing with the respective bevel-gears $f^{24}$, $f^{25}$, $f^{26}$, and $f^{27}$ and formed with clutch-faces $f^{35}$, are mounted loosely upon said hollow shafts $f^{28}$ and $f^{29}$ and operatively connected thereto by clutch-blocks $f^{36}$, adjustable along said hollow shafts and connected thereto by keys $f^{37}$, taking through slot $f^{38}$ into spindle $f^{39}$, carried inside of said hollow shafts and adjustable longitudinally therein by means of levers $f^{40}$, fulcrumed to the frame, as at 41. (See Figs. 2, 23, and 24.) These levers have their lower ends forked, as at 42, to take over pins 43, projecting from the sides of a short sleeve 44, carried loosely upon each of the shafts 28 and 29 between a pair of collars 43, formed rigidly thereon. A second series of vertical spindles $f^{42}$, $f^{43}$, $f^{44}$, and $f^{45}$ are mounted adjacent to the respective spindles $f^{18}$, $f^{19}$, $f^{20}$, and $f^{21}$ at their lower ends in bearings $f^{46}$ and at their upper ends in bearings 407, secured to the frame. Said spindles $f^{42}$, $f^{43}$, $f^{44}$, and $f^{45}$ have their upper ends projecting a short distance above the deck or platform in order to allow of independent individual adjustment of the traction-wheels, while pinions $f^{47}$ are mounted rigidly on the lower ends thereof and adapted to intermesh with the pinions $f^{23}$. A pair of sprocket-wheels $f^{48}$ $f^{48}$ are mounted rigidly upon and near the ends of the respective spindles $f^{28}$, and a single sprocket-wheel $f^{49}$ is mounted near one end of the spindle $f^{29}$. One of the sprocket-wheels $f^{48}$ upon the spindle $f^{28}$ is operatively connected to the sprocket-wheel $f^{49}$ upon the spindle $f^{29}$ by a chain $f^{52}$, and the other sprocket-wheel $f^{48}$ is connected by a chain $f^{53}$ to a sprocket-wheel $f^{54}$, mounted rigidly upon a spindle $f^{55}$, having a hand-wheel $f^{56}$, mounted rigidly thereon, such spindle being mounted in a bearing-bracket $f^{57}$ upon the deck or platform.

A series of tool-operating spindles (see Figs. 1, 2, 5, 6, 7, and 10) are guided in a series of sleeves $k'$, longitudinally slotted, as at $k^2$, and suspended at their upper ends in vertical openings in beam $k^3$, extending longitudinally and centrally of the machine from one leg to the other of the frame. The sleeves $k'$ are free to rotate in such openings in the beam and are retained against downward displacement by rigid collars $k^4$, and such upper ends of the sleeves also having bevel-gears $k^5$ mounted rigidly thereon by means of a rigid cap formed with a trunnion adapted to receive said bevel-gear, (see Fig. 5,) while the lower ends thereof are braced by a stay $k^6$, extending longitudinally of the frame and detachably connected at each end to the legs of the frame, preferably by bolts $k^{6\times}$. A series of collars $k^7$ are mounted loosely one upon each of the sleeves $k'$ and connected to the spindles $k$ by pins $k^{81}$, fixed in such collars and passing through the slots $k^2$ and the spindles $k$, thus operatively connecting the sleeves and spindles together, while allowing of the spindles being raised in such sleeves. A counter-shaft $m$ has rigidly mounted thereon a series of bevel-gears $m^\times$, adapted to engage the bevel-gears $k^5$, operatively connected to the upper ends of the sleeves $k'$, and such counter-shaft is carried longitudinally and centrally of the machine in bearings $m'$ $m'$, secured upon each end of the frame. The shaft $m$ projects a sufficient distance through its bearings to allow of gear-wheels $m^2$ $m^2$ being mounted on each end thereof, (see Figs. 12, 13, 14, and 15,) such gear-wheels intermeshing with gear-wheels $m^3$ $m^4$, carried loosely upon and adjustably connected to the main driving-shaft $c$ by a feather-and-groove connection $c^{12}$. These gear-wheels $m^3$ $m^4$ are formed with hub-sections $m^5$ $m^6$, respectively, each provided with a groove $m^7$. A pair of levers $m^8$ $m^9$ are respectively fulcrumed rigidly upon the upper end of a pair of rotatable vertical rods mounted loosely in the tubular brackets $m^{40}$ upon the frame adjacent to the respective gear-wheels $m^3$ $m^4$. The outer end of each of these lever-arms engages the groove $m^7$ of one of the hubs, while another pair of lever-arms $m^{110}$ are connected rigidly at one end to the lower ends of said vertical rods $m^{10}$ and at their other ends rotatably by the respective rods $m^{11}$ $m^{12}$ to a lever $m^{13}$ at opposite sides of and equidistant from the fulcrum-point thereof. This latter lever is fulcrumed, as at $m^{14}$, to the deck and is provided with a handle $m^{15}$. By the movement of this lever the gear-wheels $m^3$ $m^4$ can be moved either into or out of engagement with gear-wheels $m^2$ $m^3$, thereby putting the tool-carrying spindles into or out of engagement. The kind of tools carried and operated by said spindles will depend upon the work required to be done, each tool being preferably interchangeable with other forms of tools. The tools illustrated are those considered best adapted to be used in preparing the soil by loosening it to receive seed, potatoes, and the like, and such tools consist each of a disk $o$, having a central hub-section $o'$, adapted to fit over and be secured in any well-known manner, but preferably by a screw $o^{112}$, to the lower end of such spindles. Four downwardly-projecting blades $o^2$, curved to correspond to the circumference of said disk, are pivotally secured at their upper ends to said disks by means of vertical spindle projections $o^3$, adapted to take through openings in the disk and be rotatably secured therein against downward displacement, preferably by nuts $o^4$. A number of inclined plates $o^5$ are secured to the blades $o^2$ on the inside thereof, preferably three plates being secured to each blade.

The machine as described in the foregoing is adapted to loosen and disintegrate the subsoil without forming it into furrows and without inversion, and as the operation of forming the loosened subsoil into furrows is desirable simultaneously with the loosening thereof, as in the planting of potatoes, the surface of the ground and subsoil is first loosened and disintegrated, the potatoes dropped or otherwise placed in a straight line upon the loosened soil, and the soil then banked up over them. To this end a series of soil-turning tools $p$, preferably of "double moldboard" form, are carried at each end of the machine and with the cutting edges of each series facing the machine in order that one series will follow and act upon the soil after it has been loosened and disintegrated by the tools carried by spindle $k$ in whatever direction the machine may be traveling, while the other series of turning-tools can be adjusted to a position clear of the soil. The construction of these series of turning-tools and their carrying parts is as follows, reference being had to Figs. 2 and 3: Upon the front and rear sides of the machine a pair of brackets $p'$ are provided with laterally-projecting perforated lugs $p^2$ and secured in horizontal line with one another to the legs of the frame about midway of the height of such legs. A pair of brackets $p^3$, provided with laterally-projecting lugs $p^4$, are secured in vertical line with such bracket $p'$ and in a horizontal line with one another to such legs of the machine-frame near the lower ends thereof. The lower brackets $p^3$ are perforated to carry spindles $p^{4\times}$, upon which pinions $p^5$ are rigidly mounted between the laterally-projecting lugs $p^4$ of such lower brackets. The turning-tools $p$, any number of which may be used, are, as before mentioned, of double moldboard form and have web-sections $p^7$ connecting the upper edges of the V, such web also serving as a means whereby the tools may be connected, preferably by bolts, to a plate $p^8$, extending longitudinally of the machine the full length of the distance between the legs of the frame. This plate is secured at its ends rigidly by any preferable means to the lower ends of a pair of bars $p^9$, which are formed with a toothed rack $p^{16}$ on one edge and perforated in a number of places about centrally thereof, as at $p^{11}$. These supporting-bars $p^9$ are placed with their toothed edges intermeshing with the pinions $p^5$, where they are held by pins $p^{12}$ and $p^{13}$, located, respectively, in the perforations in brackets $p^2$ and $p^3$, and by rotating the spindles $p^{4\times}$ (which are provided with crank-handles $p^{14}$ for that purpose) these soil-turning tools may be raised or lowered to any desired position, in which position they can be held by inserting a pin $p^{13}$ through a perforation in the bracket $p^3$ and one of the perforations $p^{11}$. As a means of strengthening the powers of resistance of the tool-carrying plate $p^8$ such plate has a hook $p^{16}$ mounted rigidly near each end thereof, to which hook a pair of chains $p^{17}$, secured to the frame of the machine, are connected.

It is desirable at times to raise certain individual spindles, with the tools carried thereby, and at other times all of the spindles at once, the latter requirement occurring generally when the machine is to be caused to travel along a roadway from one farm to another or from one to another section of farm. A preferable means for effecting this individual or collective raising of the spindles consists of a series of preferably V-shaped levers $n$, Fig. 10, fulcrumed at their apices upon a bar $n'$, detachably connected at its ends, as at $n^2$, Fig. 20, to the frame. One arm $n^3$ of each of these levers is forked, as at $n^{10}$, (see Fig. 8,) to straddle sleeve $k'$ and take under the collars $k^7$, while the other arms $n^5$ of the levers are longer than such arms $n^3$ and project over same and terminate in handles $n^4$, and a portion $n^0$ is extended in the opposite direction to arms $n^3$ and $n^5$ and recessed to form a socket to receive a bar in order that such levers may be operated from either side of the machine. This lever mechanism just described enables any individual spindle to be raised from the ground. In order that the whole series of spindles may be raised at once, a second series of collars $k^{80}$, peripherally grooved, as at $k^9$, are mounted loosely upon the sleeves $k'$ below the collars $k^7$, and these collars $k^{80}$ are operatively connected together by bars $k^{10}$ $k^{10}$, connected rigidly to one another and to the collars $k^{80}$ by bolts $k^{11}$ $k^{11}$, passing through such bars and the grooves in the collars. By raising either of the bars $k^{10}$ all of the spindles $k$ will be raised, as will be obvious by reference to Figs. 1, 7, and 8. Additional levers can of course be used to effect this raising of all the spindles; but it is considered preferable to use any one of the levers $n$ for that purpose, and this is done by fulcruming a lever $k^{12}$ (see Figs. 2, 7, and 8) to the arm $n^3$ and offsetting the lower end thereof to form a hook $k^{13}$, adapted to take under one of the bars $k^{10}$, while the upper end of this lever is slotted to take over a laterally-projecting end $k^{14}$ of a rod $k^{15}$, (see Fig. 10,) longitudinally adjustably carried upon the side of the arm $n^5$ in brackets $k^{15\times}$. When it is desirable to raise only the spindle to which any particular lever is directly connected without disturbing the remaining spindles, it will be necessary to draw upon the rod $k^{15}$, thus disengaging the hooked portions $k^{13}$ of lever $k^{12}$ from the bar $k^{10}$.

The sleeves $k'$ are further braced and maintained in a vertical position by means of brackets $p^\times$, (see Fig. 10,) detachably secured to the under side of the deck or platform $b'$ of the machine by bolts $p'^\times$. These brackets are formed of downwardly-projecting tapered frames having horizontal bottom pieces $p^{2\times}$ supporting the said longitudinal stay $k^6$ and formed centrally thereof with a sleeve-like portion $p^3$ for the passage therethrough of the spindles. A curved supporting-section $p^{4\times}$ is secured to the inclined frame-piece farthest from the fulcrum-point of the levers, such section being perforated at different heights, as at $p^{5\times}$, to receive a pin $p^{6\times}$, which may be inserted after the lever $n$ has been raised, in order to support such lever at different heights, according to the distance it may be required to keep the spindle ends above the ground, while angular braces $p^{7\times}$ are secured at their ends to the adjacent inclined frame-pieces of the bracket $p$ and perforated at their angles to allow the passage therethrough of and give rigidity to the fulcrum-bar $n'$.

Platforms $s$ and $s'$, which are located between the legs of the frame and supported by hangers $s^2$, detachably secured by bolts $s^3$ to the framework of said legs, provide a footboard at both sides of the machine, from which the operator can operate either or all of the levers.

When the machine is to be put in operation for planting potatoes and if it is to travel in the direction indicated by the arrow in Figs. 2 and 3, the turning-tools at what will then be the front of the machine must be raised clear of the surface of the soil and the tools at the rear lowered into the subsoil a distance dependent upon the amount of soil to be banked up. The potato-planters, which may be of any well-known construction, form no part of my invention, and are therefore neither shown nor described, will preferably be supported upon the platforms $s$ and $s'$.

The supply from the planter at the front of the machine should be shut off, while that at the rear should be opened.

The engine for actuating the various operating parts of the machine is neither illustrated nor described, because it forms no part of the invention.

The shaft $c$, to which the engine is operatively connected, is continually rotated in the direction indicated in Fig. 1, and the clutch-blocks $c^3$ rotate therewith. It is supposed that the said clutch-blocks are shifted along the shaft $c$ into engagement with the left-hand bevel-gears $c^2$, (looking at Fig. 1.) These bevel-gears will then be rotated in the direction indicated, and movement will be transmitted from them through bevel-gears $g^{10}$, Figs. 1, 2, and 19, gear-wheels $g^8$, $g^6$, and $g^2$, Figs. 1, 2, 3, and 16, to spindles $g$, and thence, Fig. 16, through bevel-gears $g'$ and $f^{13}$, spindles $f^{11}$, and gear-wheels $f^{10}$ $f^8$ $f^6$, to the axles $f^4$ and traction-wheels $e, e', e^2$, and $e^3$, to which a rotation in the direction indicated in Fig. 1 will be imparted and the machine caused to travel in the direction indicated in Figs. 2 and 3. To reverse the direction of travel of the machine, the clutch-block $c^3$ should be shifted out of engagement with the left-hand bevel-gears $c^2$ into engagement with the right-hand bevel-gears $c^2$.

The machine can be steered to travel in any desired direction by means of hand-wheel $f^{56}$, hollow spindle $f^{28}$, chain $f^{52}$, hollow spindle $f^{29}$, clutch-blocks $f^{36}$, bevel-gears $f^{31}$, $f^{32}$, $f^{33}$, and $f^{34}$, $f^{24}$, $f^{25}$, $f^{26}$, and $f^{27}$, spindles $f^{18}$ $f^{19}$ $f^{21}$ $f^{22}$, elongated gear-wheels $f^{23}$, gears $f^{14}$, $f^{15}$, and $f^{17}$, and the sleeves of which may be rotated in either direction, and the bevel-gears can be disconnected from their hollow spindles by spindles $f^{39}$ and levers $f^{40}$, Figs. 1, 2, 9ª, 16, and 23. In this manner the machine can be caused to travel from farm to farm along any public roadway or from one farm-section to another farm-section.

When the machine arrives at the farm or section of farm to be cultivated and has been swung around by the steering mechanism to a position to commence work, the gears $m^3$ $m^4$ should be shifted into engagement with gears $m^2$ $m^2$ by means of levers $m^8$, rods $m^{11}$ $m^{12}$, and lever $m^{13}$, Figs. 1, 3, 12, 13, 14, and 15, thus causing the shaft $m$, Figs. 1, 2, and 25, to rotate and a rotary movement to be imparted to the rotary tools $O$ $O^2$, Figs. 1, 2, 21, and 22, through bevel-gears $m^\times$ and $k^5$, sleeves $k'$, and spindles $k$, Figs. 1, 2, 5, and 10. The spindles $k$ are lowered into the soil or raised out of it, either collectively or individually, by means of the levers $n$, Figs. 1, 2, 6, 7, 8, and 10. These operations result in the preparation of the soil to receive seed or potatoes and the like; but in a great many cases it is necessary to bank the soil over the seed or potatoes, and therefore it is essential to utilize the soil-turning tools $p$, Figs. 2 and 3. These tools are lowered the required distance into the soil by means of the cranks $p^{14}$, gears $p^5$, and racks $p^{10}$.

It will in many cases be desirable to use the main operating parts comprising the engines and the propelling and steering mechanism without the tools and the tool-operating spindles and sleeves, in which cases the bolts $p'^\times$ should be withdrawn and the connection $n^2$ displaced, thus disconnecting the bracket $p$ from the platform or deck and the bar $n'$ from the frame of the machine, when the sleeves $k'$, spindles $k$, and operating-levers $n$, together with their connecting parts, can be removed from the machine.

It will be obvious, although the machine has been described as adapted to be utilized for planting potatoes, that it can be adapted for many other operations of cultivating or harvesting without departing from the spirit of the invention.

What is claimed is as follows:

1. In apparatus for farm cultivation, a frame; a pair of vertical sleeves carried at each end of said frame; said sleeves having their lower ends forked; traction-wheels mounted rigidly upon horizontal trunnions carried loosely at the lower ends of said forked ends of the sleeves; horizontal spindles mounted near the upper ends of said forks; a train of gears operatively connecting said trunnions and horizontal spindles; a bevel-gear mounted rigidly upon each of said horizontal spindles; vertical spindles extending upwardly through said sleeves bevel-gears mounted rigidly upon the lower ends of said vertical spindles and adapted to intermesh with the above-mentioned bevel-gears; and means for rotating said vertical spindles, for the purpose set forth.

2. In apparatus for farm cultivation, a frame; a pair of vertical sleeves carried at each end of said frame; said sleeves having their lower ends forked; traction-wheels mounted rigidly upon trunnions carried loosely at the lower ends of said forked ends of the sleeves; horizontal spindles mounted near the upper ends of said forks; a train of gears carried by said fork and operatively connecting said trunnions and horizontal spindles together; a bevel-gear mounted rigidly upon each of said horizontal spindles; vertical spindles extending upwardly through said sleeves and through horizontal portions of the frame; bevel-gears mounted rigidly upon the lower ends of said vertical spindles and adapted to intermesh with the above-mentioned bevel-gears; yielding resistances between the upper ends of said hollow spindles and said horizontal portions of the frame; means for rotating said sleeves and means for rotating said vertical spindles, for the purpose set forth.

3. In apparatus for farm cultivation, a frame; a pair of vertical sleeves carried at each end of said frame; said sleeves having their lower ends forked; traction-wheels mounted rigidly upon trunnions carried loosely at the lower ends of said forked ends of the sleeves; horizontal spindles mounted near the upper ends of said forks; a train of gears carried by said fork and operatively connecting said trunnions and horizontal spindles together; a bevel-gear mounted rigidly upon each of said horizontal spindles; vertical spindles $g$ extending upwardly through said sleeves and through horizontal portions of the frame; bevel-gears mounted rigidly upon the lower ends of said vertical spindles and adapted to intermesh with the above-mentioned bevel-gears coiled springs between the upper ends of said hollow spindles and said horizontal portions of the frame; a pinion mounted rigidly upon each of said sleeves; a vertical spindle mounted in bearings carried by the frame adjacent to each of said sleeves; elongated gear-wheels mounted rigidly upon said last-mentioned spindles and adapted to intermesh with the pinions mounted upon said sleeves; bevel-gears mounted rigidly upon the upper ends of said last-mentioned spindles; horizontal shafts mounted respectively at opposite ends of the machine; bevel-gears mounted upon said horizontal shafts and adapted to intermesh with said last above mentioned bevel-gears; an operative connection between said horizontal shafts; means for rotating said horizontal shafts; and means for rotating said vertical spindle $g$, substantially as described and for the purpose set forth.

4. In apparatus for farm cultivation, a frame; a pair of vertical sleeves carried at each end of said frame; said sleeves having their lower ends forked; traction-wheels mounted rigidly upon horizontal spindles carried loosely at the lower ends of said forked ends of the sleeves; pinions mounted rigidly upon said sleeves; a vertical spindle mounted adjacent to said hollow spindles; elongated gear-wheels mounted rigidly upon said last-mentioned spindles and adapted to intermesh with the pinions mounted upon said sleeves; bevel-gears mounted rigidly upon the upper ends of said last-mentioned spindles; horizontal shafts mounted respectively at opposite ends of the machine; bevel-gears mounted loosely upon said horizontal spindles and adapted to intermesh with said last above mentioned bevel-gears; an operative connection between said horizontal spindles; means for rotating said horizontal spindles; means for operatively connecting and disconnecting said bevel-gears to and from said hollow shafts; and means for rotating said wheels substantially as and for the purpose set forth.

5. In apparatus for farm cultivation, a frame; a pair of vertical sleeves carried at each end of said frame; and adapted to yieldingly support same; said sleeves having their lower ends forked; traction-wheels mounted at the lower ends of said forked ends of the sleeves; a pinion mounted rigidly upon each of said sleeves; vertical spindles mounted in bearings carried by the frame adjacent to each of said sleeves; an elongated gear-wheel mounted rigidly upon said vertical spindles and adapted to intermesh with the pinions mounted upon said sleeves; bevel-gears mounted rigidly upon the upper ends of said last-mentioned spindles; a horizontal hollow shaft mounted at each end of the machine; spindles carried within said hollow shafts and adjustable longitudinally thereof; bevel-gears mounted upon said horizontal hollow shaft and formed with clutch-faces and the teeth of these gears being adapted to intermesh with said last above mentioned bevel-gears; clutch-blocks mounted loosely upon said hollow shafts adjacent to the clutch-faces of said gears; an operative connection between said clutch-blocks and internal spindles; an operative connection between said horizontal shafts; means for rotating said horizontal shafts; means for adjusting said internal spindles; vertical spindles mounted in bearings carried by the frame adjacent to said last-mentioned vertical spindles and having their upper ends provided with hand-wheels, pinions mounted rigidly upon the other ends thereof and adapted to intermesh with a pinion mounted upon each of said last above mentioned spindles, substantially as and for the purpose set forth.

6. In an apparatus for farm cultivation, the combination with the frame and means for propelling the same, of a series of rotatable and vertically-movable spindles carrying digging-tools, a coupling-bar extending between said spindles arranged to raise all of said spindles but to permit individual lifting of the spindles independent of said bar, lifting means connected with each spindle for independently raising the same and a detachable connection between a portion of said levers and said bar whereby all the spindles may be raised simultaneously, substantially as described.

7. In apparatus for farm cultivation, a rotatable soil-loosening tool consisting of a horizontal disk, having downwardly-projecting horizontally-curved blades secured to the under side thereof and the forward ends of said blades having a horizontally-swinging connection with said disk and said blades having diagonally-arranged plates secured thereto, and means for rotating said tool substantially as and for the purpose set forth.

8. In apparatus for farm cultivation, a frame of inverted-U shape, a pair of traction-wheels carried at each end of said frame by the legs thereof; a series of vertical tool-carrying spindles carried intermediate of the legs of said U-shaped frame; a horizontal driving-shaft carried upon and longitudinally of said frame; means for operatively connecting and disconnecting said spindles and driving-shaft; means for operatively connecting and disconnecting said traction-wheels and driving-shaft; and means for rotating said driving-shaft, for the purpose set forth.

9. In apparatus for farm cultivation, a frame of inverted-U shape, a pair of traction-wheels carried at each end of said frame by the legs thereof; a series of vertical tool-carrying spindles carried intermediate of the legs of said U-shaped frame; a horizontal driving-shaft carried upon said frame longitudinally thereof; means for operatively connecting and disconnecting said spindles and driving-shaft; means for operatively connecting and disconnecting said traction-wheels; and means for rotating said driving-shaft, for the purpose set forth.

10. In apparatus for farm cultivation, a frame of inverted-U shape, a pair of traction-wheels carried at each end of said frame by the legs thereof; a series of vertical tool-carrying spindles carried intermediate of the legs of said U-shaped frame; a horizontal driving-shaft carried upon said frame and longitudinally thereof; means for operatively connecting and disconnecting said spindles and driving-shaft; means for operatively connecting and disconnecting said traction-wheels and driving-shaft; means for reversing the direction of vertical rotation of said traction-wheels; and means for rotating said driving-shaft for the purpose set forth.

11. In apparatus for farm cultivation, a frame of inverted-U shape, a pair of traction-wheels carried at each end of said frame by the legs thereof; a series of vertical tool-carrying spindles carried intermediate of the legs of said U-shaped frame; a horizontal driving-shaft carried upon and longitudinally of said frame; means for operatively connecting and disconnecting said spindles and driving-shaft; means for operatively connecting and disconnecting said traction-wheels and driving-shaft; means for horizontally adjusting said traction-wheels; means for reversing the direction of vertical rotation of said traction-wheels; and means for rotating said driving-shaft, for the purpose set forth.

12. In apparatus for farm cultivation, a frame; means for propelling said frame; a series of vertically-adjustable tool-carrying spindles carried by said frame; a series of levers fulcrumed to the said frame and operatively connected to said spindles; a platform carried by said frame and adapted to afford a foot-board adjacent to said levers, a link having a lifting connection with each of said spindles, said spindles being free to be lifted independently of said link and means for raising said link substantially as and for the purpose set forth.

13. In apparatus for farm cultivation, a traveling frame; a series of vertical adjustable tool-carrying spindles carried by said frame; a series of levers fulcrumed to the said frame and operatively connected to said spindles; a platform carried by said frame and adapted to afford a foot-board adjacent to said levers, a link having a lifting connection with each of said spindles, said spindles being free to be lifted independently of said link, and a detachable connection between said levers and said link, substantially as and for the purpose set forth.

In testimony whereof I affix my signature in presence of two witnesses.

FRANK L. MIDDLETON,
*Administrator of the estate of Robert Romaine, deceased.*

Witnesses:
HENRY E. COOPER,
WALTER DONALDSON.